United States Patent
Osborne et al.

[11] 3,831,977
[45] Aug. 27, 1974

[54] SELF-PROPELLING VEHICLE

[76] Inventors: David E. Osborne, 14556 Harvard Ct., Los Altos Hills, Calif. 94022; Harold M. Knoerle, 950 Continental Dr., Menlo Park, Calif. 94025

[22] Filed: June 14, 1972

[21] Appl. No.: 262,862

[52] U.S. Cl. .................................... 280/229
[51] Int. Cl. .................................... B62m 1/00
[58] Field of Search............. 280/229, 87.04, 87.05, 280/217, 220, 221

[56] References Cited
UNITED STATES PATENTS

| | | | |
|---|---|---|---|
| 1,679,819 | 8/1928 | Fageol | 280/229 |
| 2,125,568 | 8/1938 | Huyssen | 280/229 |
| 3,086,795 | 4/1963 | Hatcher | 280/229 |
| 3,336,046 | 8/1967 | Seiling | 280/229 |
| 3,647,241 | 3/1972 | Huyssen | 280/229 |
| D148,848 | 3/1948 | Gezari | 280/87.04 X |

FOREIGN PATENTS OR APPLICATIONS

| | | | |
|---|---|---|---|
| 278,457 | 1/1958 | Australia | 280/87.04 |
| 173,783 | 3/1935 | Switzerland | 280/87.04 |
| 9,736 | 10/1890 | Great Britain | 280/217 |

*Primary Examiner*—David Schonberg
*Assistant Examiner*—Terrance L. Siemens
*Attorney, Agent, or Firm*—John L. McGannon, Esq.

[57] ABSTRACT

A vehicle of the type wherein the rider shifts his body up and down to drive an eccentrically mounted wheel mounted on the rear end of a frame composed of a pair of spaced, resilient bars. Each bar has a front, forwardly inclined segment integral with a respective central segment, each front segment being displaceable rearwardly relative to the corresponding central segment to add to the torque applied to the rear wheel during the acceleration phase of each revolution thereof. Adjustable handlebar means is coupled with the front wheel of the vehicle.

7 Claims, 6 Drawing Figures

PATENTED AUG 27 1974  3,831,977
FIG. 1
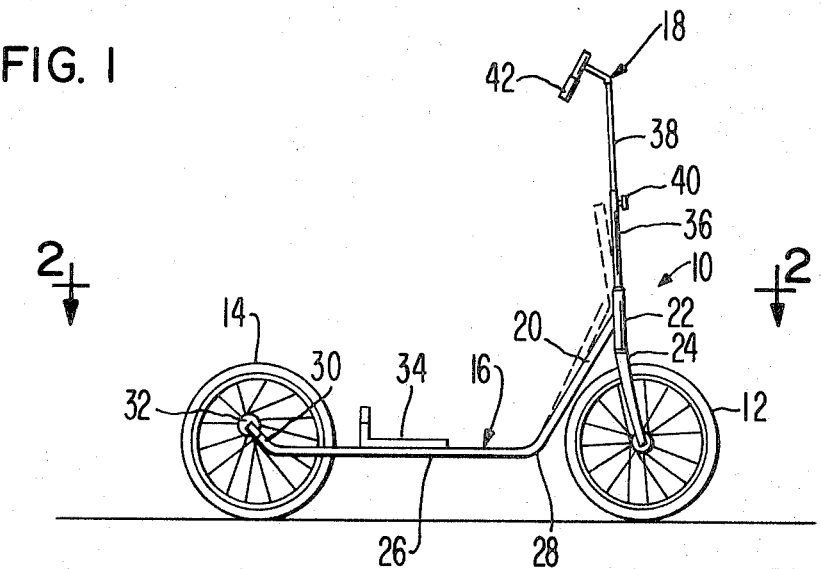
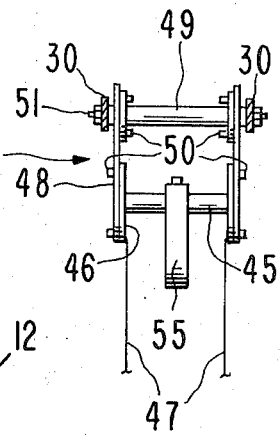
FIG 4a
FIG. 2
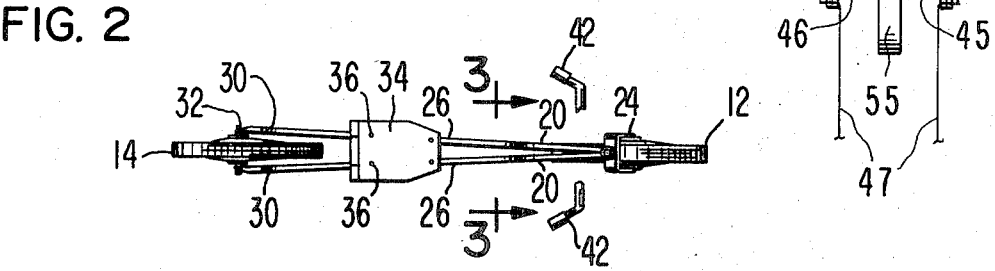
FIG. 4
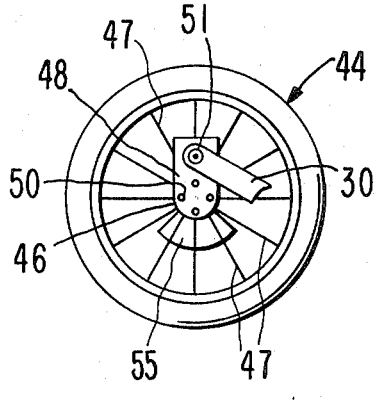
FIG. 3
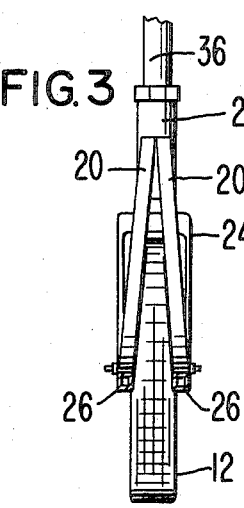
FIG. 5
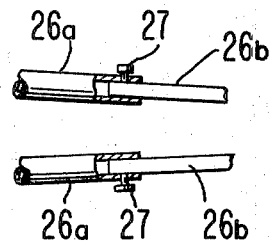

SELF-PROPELLING VEHICLE

This invention relates to improvements in self-propelling vehicles of the type in which the rider shifts his weight up and down to sustain the rotation of an eccentrically mounted rear wheel of the vehicle.

Vehicles of the type described have been disclosed in U.S. Pat. Nos. 1,664,864, 1,679,819, 1,705,540, 2,086,471 and 3,086,795. For the most part, these prior structures, with the exception of U.S. Pat. No. 1,679,819, disclose only rigid frames which cannot be relied upon to obtain added torque during the acceleration phase of the rear wheel. The pumping action of the rider is the only source of the driving force. In U.S. Pat. No. 1,679,819, the platform portion of the frame is a leaf spring which is flexed at its center by the rider and relatively little torque is added to the rear wheel during acceleration thereof because the moment arm between the center of the platform and the rear axle is relatively short.

The vehicle of this invention has a frame which gives a greater torque to the axle of its eccentrically mounted gear wheel than that capable of being generated by the spring frame mentioned above. This is achieved by the use of a frame formed of a pair of spaced bars of resilient material, each bar having a front, inclined segment integral with a central segment in a manner to permit the front segment to yield about its junction with the central segment when rearward force is applied to the handlebars coupled to the front of the vehicle. If this is done in rhythm with up and down body movements of the rider, a greater torque is generated at the rear axle because of the increased restoring force of the spring defined by the two bars and because of the greater length of the moment arm, i.e. the full length of the central segment. As a result, the rider can get up to riding speed faster and can even increase the speed with relatively little additional effort, thereby adding to the enjoyment of the use of the vehicle as well as to provide a stimulus to utilize the vehicle in contests such as a race or the like.

The primary object of this invention, therefore, is to provide a self-propelling vehicle of the type described wherein its frame is constructed to provide a relatively large torque on the rear axle of the vehicle during up and down body movements of the rider by virtue of the spring action of the frame itself to allow the vehicle to come up to riding speed faster and to permit the speed to be increased with little additional effort.

Another object of this invention is to provide a vehicle of the type described wherein the frame is comprised of a pair of spring bars which are shaped to achieve a flexing action by the user as a result of back and forth movements of the handlebars of the vehicle during up-down body movements of the rider whereby additional accelerating torque may be applied to the rear axle to sustain normal riding speed or to increase the speed of the vehicle.

Other objects of the invention will become apparent as the following specification progresses, reference being had to the accompanying drawings for an illustration of the invention.

The vehicle of this invention is broadly denoted by the numeral 10 and is in the form of a scooter having a front wheel 12, a rear wheel 14, a frame 16 interconnecting the wheels, and a handlebar 18 coupled to the forward end of the frame. Vehicle 10 is of the self-propelling type wherein rear wheel 14 is eccentrically mounted to the rear end of frame 16, requiring an up-down movement of the body of the vehicle rider to sustain forward motion.

Frame 16 is comprised of a pair of spaced bars of resilient material, such as spring steel or the like. Each bar is tubular and, for purposes of illustration only, is square in cross section as shown in FIG. 3. Each bar has a front, forwardly inclined, segment 20 which converges with the front segment 20 of the other bar. The front ends of segments 20 are rigid to the rear side of a sleeve 22 in which the upper extension of a fork 24 is rotatably received. The fork is used for mounting wheel 12 to the frame.

The bars have central, generally horizontal segments 26 integral with segments 20, segments 26 diverging as the rear end of the frame 16 is approached. The junction between segments 20 and 26 of each bar, shown by a curved segment 28, is shaped to allow some spring action between the two segments. To this end, segment 28 has a convex, downwardly facing outer surface and a concave, upwardly facing inner surface. Segments 20 are longitudinally straight between the corresponding segment 26 and sleeve 22. This configuration allows junction segment 28 to yield to permit rearward movement of front segment 20 relative to the corresponding central segment 26 as handlebar 18 is pulled rearwardly.

Each bar has a rear, upwardly inclined segment 30 for attachment to the axle 32 of rear wheel 14. A platform 34 is coupled to the bars, such as by screws 36 so that the rider can stand on the frame during forward movement of the vehicle.

Fork 24 has an extension 36 which projects upwardly from sleeve 22. Handlebar 18 includes a rod 38 telescoped within tube 36 and adjustably secured thereto by a set screw 40. A pair of handlebar extensions 42 are secured to the upper end of rod 38.

In operation, the user places the vehicle in motion by running alongside the same while grasping handlebar extensions 42. During this time, axle 32 of rear wheel 14 oscillates up and down as does the rear end of frame 16 while the vehicle moves forwardly. When a certain forward speed is attained, the rider jumps a platform 34 and commences an up-down movement of the upper part of the body by flexing the knees in rhythm with the up-down movement of the rear end of the frame. For proper self-propulsion of the vehicle, the rider's body should move downwardly as axle 32 commences to move downwardly so that the axle will be accelerated downwardly. This will force the axle down at a rate sufficient to maintain the riding speed of the vehicle, at which speed the rider can remain on the platform without having to hop off to maintain his balance.

Simultaneously with the downward movement of the body, the rider pulls rearwardly on handlebar extensions 42 to cause segments 20 to move rearwardly relative to central segments 26 about an axis through the junction therebetween with the axis being transverse to the segments. The restoring force resisting such flexing action appears as a torque at the rear ends of the bars, i.e. at axle 32, thereby supplementing the torque applied to axle 32 and cooperating with the body movements to thereby further increase the speed of the vehicle. The rider, therefore, continues to move his body up and down while alternately pulling back and releasing the force on the handlebars in a predetermined rhythm determined by the time of a cycle of oscillation of rear axle 32.

A typical diameter for rear wheel 14 is 28''. However, wheels of other diameters can be used if desired. Also, it is possible to use a pair of rear wheels rather than a single rear wheel. In either case, the action achieved with the instruction of the frame 16 can be realized.

In FIG. 1, rear wheel 14 is constructed so that its rear axle is mounted eccentrically with respect to the central axis of the wheel. In this respect, the wheel has spokes of various lengths, the arrangement of the spokes being such that the axle is off-center.

Another form of the rear wheel is shown in FIG. 4 and is denoted by the numeral 44. In this case, rear wheel 44 is a standard wheel with spokes 47 of the same length and provided with first shaft 45 concentric with the wheel itself. Mounted on this shaft is a pair of plates 48. The plates are radial to shaft 45 and extend in the same direction, namely, upwardly from the shaft. A second shaft 49 is secured to plates 48 above shaft 45 and parallel therewith. Bolts 50 secure plates 48 to annular end members rigid to shafts 45 and 49.

Shaft 49 is tubular and has a rod or shaft 51 extending therethrough. A pair of bearings (not shown) rotatably mount shaft 49 on shaft 51. Shaft 51 is connected at its ends to the upper rear ends of the corresponding rear segments 30 of frame 16. The bearings on shaft 51 allow plates 48 and thereby wheel 44 to rotate about the axis of shaft 51. Thus, shaft 51 defines the rear axle for wheel 44 so as to mount the latter eccentrically on segments 30. A crescent-shaped counterweight secured to shaft 45 increases the rotational inertia of wheel 44. The counterweight rotates with shaft 45.

Frame 16 can be made so that it can separate into two parts for storage or for ease in packaging. To this end, each central segment 26 is formed of two parts 26a and 26b. Each part 26a is tubular and has an inner diameter for telescopically receiving the corresponding part 26b. A set screw 27 threadably carried by part 26a releasably interconnects the two parts.

When it is desired to separate the frame so as to disassemble the vehicle, set screws 27 are loosened, allowing parts 26be to b pulled out of corresponding parts 26a, whereupon the two sections of the vehicle can be more readily stored or packaged. For purposes of illustration, parts 26a and 26b are transversely circular.

We claim:

1. A wheeled vehicle comprising: a frame having a pair of generally spaced resilient members, each member having a first, rigid segment for supporting a rider and a second, rigid segment integral with the first segment and extending upwardly and forwardly therefrom, the junction between the segments of each member being yieldable to permit the second segment to move forwardly and rearwardly relative to the first segment; a rotatable front wheel; means pivotally mounting the front wheel on the outer ends of the second segments of said members; the second segments being the only parts of the frame coupled to said mounting means, each second segment being longitudinally straight between the corresponding first segment and said mounting means; a rear wheel having an eccentrically mounted rear axle; means mounting said axle on the rear ends of said segments with said wheel disposed therebetween and rotatable thereto; and handlebar means coupled with said front wheel for pivoting the same relative to said frame.

2. A vehicle as set forth in claim 1, wherein said second segments converge toward each other as their outer ends are approached.

3. A vehicle as set forth in claim 1, wherein said first segments diverge as their rear ends are approached.

4. A vehicle as set forth in claim 1, wherein is provided a platform mounted on the frame in spanning relationship to said first segments.

5. A vehicle as set forth in claim 1, wherein each member has a curved segment defining the junction between and interconnecting the corresponding first and second segments, said curved segment having a convex lower surface.

6. A vehicle as set forth in claim 1, wherein each member is tubular throughout a major portion of its length.

7. A self-propelling wheeled vehicle comprising: a frame having a pair of elongated spring members, each member having a front, upwardly inclined segment, a central, generally horizontal segment, and a rear, upwardly inclined segment, the segments of each member being integral with each other, the front segments of said members being relatively convergent as their forwardmost, upper ends are approached; a ground-engaging front wheel; means pivotally mounting the front wheel on said forwardmost, upper ends of the front segments, there being a curved, yieldable junction between each front segment and the corresponding central segment, respectively, the front segments being longitudinally straight between respective central segments and said mounting means and being the only parts of said frame coupled to said mounting means, whereby the front segments can move forwardly and rearwardly relative to said central segments about an axis through said junction; handlebar means coupled with the front wheel for pivoting the same relative to said frame; a ground-engaging rear wheel having an eccentrically mounted axle; means coupling said axle to the rear ends of said rear segments with said rear wheel being disposed therebetween; and a platform mounted on the central segments.

* * * * *